United States Patent
Painchault et al.

(10) Patent No.: US 8,238,368 B2
(45) Date of Patent: Aug. 7, 2012

(54) METHOD AND SYSTEM MAKING IT POSSIBLE TO MANAGE ERRATIC INTERRUPTIONS IN A TRANSMISSION SYSTEM

(75) Inventors: Philippe Painchault, Asnieres (FR); Sandrine Agagliate, Paris (FR); Eric Garrido, Soisy/Montmorency (FR)

(73) Assignee: Thales (FR)

( * ) Notice: Subject to any disclaimer, the term of this patent is extended or adjusted under 35 U.S.C. 154(b) by 213 days.

(21) Appl. No.: 12/281,043

(22) PCT Filed: Feb. 28, 2007

(86) PCT No.: PCT/EP2007/051917
§ 371 (c)(1),
(2), (4) Date: Feb. 17, 2009

(87) PCT Pub. No.: WO2007/099130
PCT Pub. Date: Sep. 7, 2007

(65) Prior Publication Data
US 2009/0290484 A1    Nov. 26, 2009

(30) Foreign Application Priority Data
Feb. 28, 2006 (FR) ..................... 06 01775

(51) Int. Cl.
*H04J 3/16* (2006.01)
(52) U.S. Cl. .................. 370/470; 370/315
(58) Field of Classification Search ............. 455/3.02; 370/316, 203; 375/295
See application file for complete search history.

(56) References Cited

U.S. PATENT DOCUMENTS

| | | | |
|---|---|---|---|
| 2002/0120592 A1* | 8/2002 | Juels et al. | 706/8 |
| 2004/0010743 A1* | 1/2004 | Lee et al. | 714/748 |
| 2009/0067538 A1* | 3/2009 | Thesling | 375/295 |

FOREIGN PATENT DOCUMENTS

GB   1468999   3/1977

* cited by examiner

*Primary Examiner* — Derrick Ferris
*Assistant Examiner* — Matthew Hopkins
(74) *Attorney, Agent, or Firm* — Lowe Hauptman Ham & Berner, LLP

(57) ABSTRACT

Method and system are disclosed for managing erratic interruptions in a transmission system where the messages to be transmitted are composed of data packets and are expressed by means of a polynomial of degree t−1. The senders and the receivers share information making it possible to reference the data packets. In the course of the transmission of a message represented by a polynomial P, at least t points Ai are generated and P(Ai) of the polynomial P is evaluated, with t' greater than or equal to t. The evaluations P(Ai) are transmitted of the t' points to the receiver or receivers concerned, with information allowing the receivers to detect the transmission errors. Each receiver verifies that it has received t valid evaluations, that is to say free of transmission errors, uses the information referencing the packets and the t valid evaluations P(Ai) of the polynomial to determine the points Ai, and on the basis of the P(Ai) and of the Ai and determines the polynomial P used and on the basis of said polynomial deduces the message therefrom.

6 Claims, 1 Drawing Sheet

METHOD AND SYSTEM MAKING IT POSSIBLE TO MANAGE ERRATIC INTERRUPTIONS IN A TRANSMISSION SYSTEM

CROSS-REFERENCE TO RELATED APPLICATIONS

The present application is based on International Application No. PCT/EP2007/051917, filed on Feb. 28, 2007, which in turn corresponds to French Application No. 0601775, filed on Feb. 28, 2006, and priority is hereby claimed under 35 USC §119 based on these applications. Each of these applications are hereby incorporated by reference in their entirety into the present application.

FIELD OF THE INVENTION

The invention relates notably to a method and a system for managing interruptions during the reception of a signal in a transmission system.

BACKGROUND OF THE INVENTION

One of the problems posed in information transmission systems is the way to manage information losses due to interruptions in the communication, which interruptions may be erratic.

Following an "erratic" send or receive, a receiver may not have access to several packets of the message transmitted and not be able to send a request to the sender to ask for the missing packets.

Packet losses being not predictable, the message may be transmitted several times to avoid information losses. A simple procedure consists, for example, in repeating the message. The receiver losing several packets must listen, possibly several times, to the whole of the message. For long messages and/or in the case of low bandwidth, this way of operating may become problematic. In all cases, it leads to a significant time loss.

SUMMARY OF THE INVENTION

The invention relates to a method for managing erratic interruptions in a transmission system where the messages to be transmitted are composed of data packets and are represented by a polynomial of degree $t-1$, the senders and the receivers sharing information making it possible to reference the data packets, characterized in that it comprises at least the following steps:

in the course of the transmission of a message represented by a polynomial P, generating $t'$ points $A_i$ and the evaluations $P(A_i)$ of the polynomial P with $t'$ greater than or equal to $t$,
  transmitting the evaluations $P(A_i)$ of the $t'$ points $A_i$ to the receiver or receivers concerned, with information allowing the receiver to detect the transmission errors,
  each receiver:
    1) verifies that it has received $t$ valid evaluations, that is to say free of transmission errors,
    2) uses the information referencing the packets and the $t$ valid evaluations $P(A_i)$ of the polynomial to determine the points $A_i$, and on the basis of the $P(A_i)$ and of the $A_i$,
    3) determines the polynomial P used and on the basis of said polynomial deduces the message therefrom.

It is possible to use an interpolation function to determine the polynomial.

The message is, for example, divided into several parts and the steps of the previously described method are applied to each part.

During error detection, the evaluations $P(A_i)$ contained in an erroneous "page" are, for example, deleted and the receiver continues listening for new pages.

The signaling C0 associated with a message C is transmitted for example, the signaling being composed of T0*N0 bits and seen as a polynomial of degree (T0−1) and on reception:
  T0 pages not containing any errors are collected, and each page using a different point from the other pages, on the basis of these pages the signaling C0 is reconstructed using a polynomial interpolation,
  the length of the message C and the way in which the message C has been sliced into F frames are deduced on the basis of C0, each frame sliced into q words, each of the words being represented by a polynomial of degree (T−1),
  T error-free evaluations of the polynomial are collected for each polynomial corresponding to a word, and
  by using distinct points, the message C is reconstructed using the polynomial interpolation.

The steps of the method apply in a transmission system comprising a communication satellite.

The invention also relates to a system for managing erratic interruptions in a transmission system comprising one or more senders Ej and one or more receivers Rk, where the messages to be transmitted are composed of data packets and are expressed by means of a polynomial of degree $t-1$, the senders and the receivers sharing information making it possible to reference the data packets characterized in that it comprises at least the following elements: a formatting center and the receivers being provided with means suitable for executing the steps of the stated method.

The method according to the invention exhibits notably the following advantages:
  It offers resistance to possible interruptions during the transmission of information,
  It makes it possible to increase the apparent bandwidth by taking into account the diversity of the senders.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DESCRIPTION OF THE PREFERRED EMBODIMENTS

Figure 1:
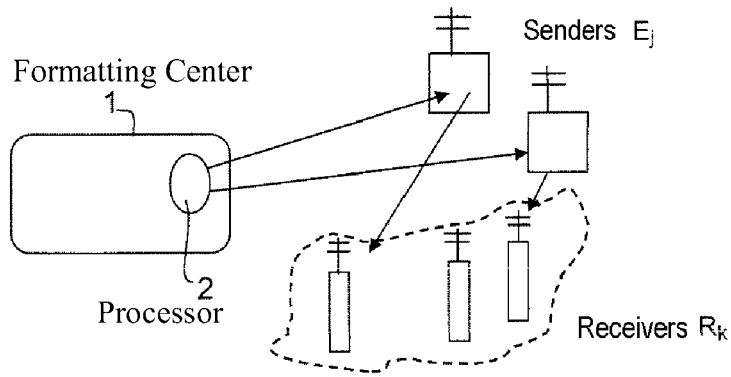
FIG. 1 an exemplary architecture of a system for which the invention applies, and FIG. 2 the multiplexing of the information relating to the message and of the signaling when it exists.

In order to better elucidate the principle implemented in the invention, the description is given by way of illustration for a system comprising one or more senders Ej, a center 1 for managing or formatting the messages and one or more receivers Rk. The formatting center 1 is equipped with a processor 2 adopted for executing the steps of the method according to the invention that are detailed hereinafter and for generating signals. The receivers are also provided with means such as microprocessors (not represented for simplification reasons) suitable for executing the calculations implemented in the method.

The management center 1 formats the messages in data packets called "pages". It transmits the data packets or pages to one or more senders, the senders transmitting the latter to the receivers.

Within the framework of the example, the assumption is made that the senders and the receivers share information called "[page ref]", thus making it possible to reference each page. This information can be, for example, a temporal reference known by each (senders and receivers), or a specific field included in the page like a page number. Generally, any information making it possible to reference a data packet may be used.

In a simplified manner, the method according to the invention relies on the following principle: a message M which has to be transmitted to one or more receivers is decomposed by the formatting center into t symbols $s_0, s_1, \ldots, s_{t-1}$.

Each symbol $s_i$ is represented by an element in a finite field GF, that is to say in a set GF having a finite number of elements and furnished with 2 operations + (addition) and * (multiplication). For simplification reasons, the assumption is made that this finite field is $GF(2^n)$, that is to say the field having $2^n$ elements (without departing from the scope of the invention any finite field may be suitable). Thus the symbols are composed of n bits and the size of the message M is n*t bits.

The message M is represented by the polynomial:

$$P(X)=s_0+s_1X+s_2X^2+\ldots +s_{t-1}X^{t-1} \text{ with coefficients in } GF(2^n).$$

The idea of the present invention uses notably evaluations of the polynomial P at t distinct points $A_0, A_1, \ldots, A_{t-1}$, that is to say $P(A_0), P(A_1), \ldots, P(A_{t-1})$, to determine the t coefficients $s_0, s_1, \ldots, s_{t-1} \ldots$ of the polynomial representing the message. These evaluations $P(A_i)$ are symbols of n bits in $GF(2^n)$. The formatting center will fill the pages (or message packets) with evaluations of the polynomial P at several different points Ai. The number of polynomial evaluations $P(A_i)$ is notably chosen as a function of the degree of the polynomial.

This way of proceeding does not affect the total number of bits (n*t) that the receiver stores in order to reconstruct the whole message M.

The formatting center 1 generates several points Ai on the basis of the parameter [page ref] of a page. During the entire session of the transmission of the message, (which entire session corresponds to the transmission of the message from a sender to a receiver) the formatting center generates points which are different for each page (or which have a high probability of being different). In particular, the center generates more than (n*t) points Ai and evaluations of the polynomial P(Ai) for the corresponding points Ai. The number of points generated depends on the length of the session. The sender (senders) dispatches (dispatch) the evaluations P(Ai) to the receiver (receivers).

Thus, a receiver Ri only has to store t various evaluations P(Ai) to be capable of reconstructing the whole of the message M, regardless of the instants at which it receives them (whether or not there are interruptions in the reception of the pages). The minimum number t that a receiver has to store is dependent on the degree of the polynomial used for the message. The indicator [page ref] allows the receiver to calculate the points Ai corresponding to the evaluations P(Ai) that it receives.

If the receiver is capable of listening in parallel to several senders, and if each of them dispatches different evaluations, then the reception time required to recover t evaluations corresponds to the reception times if there were only a single receiver, divided by the number of receivers.

Steps for Reconstructing the Message

To reconstruct the message, a receiver must have acquired at least t valid evaluations of a polynomial P corresponding to t distinct points $A_0, A_1, \ldots, A_{t-1}$ with $z_0=P(A_0)$, $z_1=P(A_1), \ldots, z_{t-1}=P(A_{t-1})$, which are elements of the finite field GF.

The validity of the points is checked, for example, by using procedures known to the person skilled in the art, examples of which are given hereinafter.

Knowing the points and the corresponding evaluations, it uses for example the interpolation of the Lagrange polynomial $L_j(X)$ to determine the polynomial P in the following manner:

$$P(X)=z_0*L_0(X)+z_1*L_1(X)+\ldots +z_{t-1}*L_{t-1}(X)$$

where, for $0<=j<=t-1$, $L_j(X)$ is the unique polynomial of degree (t−1) such that $L_j(A_k)=1$ for j=k and $L_j(A_k)=0$ for j<>k Specifically, the polynomial $L_j(X)$ is calculated in the following manner:

$$L_j(X)=B(j)*(\text{the product of } t-1 \text{ monomials}(X-A_k),$$
$$\text{such that } 0<=k<=t-1 \text{ and } k<>j)$$

B(j) is the element of $GF(2^n)$ which is the inverse in $GF(2^n)$ of the product of the t−1 elements $(A_j-A_k)$ for $0<=k<=t-1$ and $k<>j$.

Knowing the polynomial, a receiver then knows the message.

The processing steps described above apply for sufficiently short messages.

For long messages, it is possible to slice this message into parts having an "appropriate" length and to apply the basic principle to each of the parts. The detailed description of an exemplary embodiment below indicates, inter alia, a way of choosing the various parameters so as to have an appropriate length of the parts of the message.

Additionally, the receiver must be capable of detecting possible errors due to poor transmission or reception of the pages. An error correction mechanism is not compulsory, simple error detection is sufficient. The erroneous pages will be simply erased by the receiver, and the latter will have to continue listening for sender(s) to recover other pages (whichever ones).

The subsequent description gives an example applied to a message C transmitted to a receiver during a session, the receiver not having any predefined information about the message C (length, nature, etc.).

It is then necessary to also transmit a signaling C0 containing the useful information regarding C.

The page format is, for example, the following:
[Page ref] [Signaling field] [useful message field] [MAC/CRC].

Where
 [Page ref] indicates the page number which identifies the page. This parameter can also be used to encipher the page in "counter" mode,
 [Signaling Field] gives information about the signaling C0,
 [useful message field] gives information about the message C,

[MAC/CRC] contains a MAC ("Message Authentication Code") or a CRC ("Cyclic Redundancy Check") making it possible to detect errors at the page level. It can also be used for authentication.

A simple way of implementing the diversity principle comprises, for example, the following steps:

the useful datum of a page is composed of N_p=N0+q*N bits, i.e. composed of N0 bits for the field [Signaling Field] and q packets of N bits for the field [useful message field]. The parameters (N0, N, q) are discussed afterwards in the description, the signaling C0 is composed for example of T0*N0 bits and is seen as a polynomial of degree (T0−1) in $GF(2^{N0})$. The field [signaling field] of a page contains an evaluation of the polynomial at a point, this point being calculated on the basis of [page ref], the message C is composed of F frames, each frame is composed of q words, each word is composed of T*N bits and is seen as a polynomial of degree (T−1) in $GF(2^N)$. The field [signaling field] of a page contains q packets giving information about a frame of C selected by virtue of the parameter [Page ref]. Each of these q packets is an evaluation of a polynomial at a point calculated on the basis of the parameter [Page ref], for a given session and a given message C, the center calculates the pages giving the information about C as was previously described. A mode of transmission is, for example, obtained when the center transmits pages to several senders and each sender transmits to the receiver pages which are different from those transmitted by the other senders.

A simple way of obtaining this diversity of signals is to force the center to distribute various pages to various senders.

The processing of the page at the level of a receiver comprises, for example, the following steps:

the size N0*T0 of the signaling is predefined and known by the receiver. The receiver collects T0 pages, such that each page does not contain any error (check with [MAC/CRC]) and each page uses a different point from the other pages (point that can be calculated on the basis of [page ref]). The receiver reconstructs the signaling C0 on the basis of these pages by using the Lagrange polynomial interpolation as is explained hereinafter, by virtue of C0, the receiver knows the length of the message C. It collects T pages of each frame of C (pages without error and by using distinct points). Thereafter it reconstructs the message C using the Lagrange polynomial interpolation.

The subsequent description details the choosing of the parameters, the signaling C0, the detailed multiplexing of C and C0 in the pages using the diversity principle, and a procedure for the receiver in order to reconstruct the whole of the message on the basis of the pages.

Choosing the Parameters

We denote by:

N_p the number of bits per page which are reserved exclusively for the effective data, that is to say, for the fields [Signaling Field] and [useful message field], N a number less than or equal to the number of bits of [Page ref], N0 and q are numbers such that N_p=q*N+N0.

So as to have an effectiveness parameter close to 1, the parameters N and N0 will be chosen for example so as to satisfy:

$$2^{N/2} \geq \frac{|Word|}{N} = T$$

and $$2^{N0/2} \geq \frac{|C0|}{N_0} = T0$$

where |C0| is the size of C0, and |Word| is the size of a word contained in C.

These two conditions are not compulsory but ensure that there is no collision between the selected points of [Page ref], with a high probability. The most important condition is the first. The second can be readily toned down (T0 can be a little larger than $2^{N0/2}$) since the signaling C0 is usually shorter than the message C.

In all cases it is absolutely essential that $2^N \geq T$ and $2^{N0} \geq T0$ to ensure that the number of symbols of the message is less than the number of total of points. For a given number N_p, these conditions set the parameters N and N0, as well as the other parameters, i.e. T0 if |C0| is fixed, |Word| and T.

Format of the Message C and Signaling C0

The message C is divided into one or more frames of q*T*N bits. To ensure this format size, the message C is for example formatted with a "padding" field of variable size serving as padding. A header giving the size of the "padding" can be included in the message C or in the signaling C0.

Signaling C0

The length |C0| of C0 is a multiple of N0. T0 denotes the number of parts of N0 bits in C0, i.e. such that |C0|=T0*N0. This message can contain, for example, the following information:

| Fields C0 | Description |
|---|---|
| [Message type] | Codes several predefined types of message |
| [Length of C] | Codes the length of the message C (see below) |
| [Temporal Information about C] | Indicates the start and end date (or time) of the session during which the message C is sent |
| [Padding] | Padding (optional) making it possible to have a size |C0| which is a multiple of N0 |
| [MAC] | MAC allowing the receiver to verify that C0 has been received correctly |

Field [Length of C]

A message C is divided into F frames of q*T*N bits. The parameters N and q are fixed and known to the receiver. The length of the message C is given by the following two fields:

[size of a word in C (N/2 bits)]: value of T−1, where T is the number of symbols of N bits in a word, $1 \leq T \leq 2^{N/2}$.

[number of frames in C]: value of F.

Definition of the Multiplexing

The information bits of C0 and C are multiplexed in the N_p bits of the pages in progress.

The useful packet of N_p bits is decomposed into (1+q) parts denoted:

M(0), M(1), M(2), . . . , M(q).

Subsequently in the document a symbol of N bits is called an "N-symbol", it being possible for the latter to be seen as an element of the finite field $GF(2^N)$. Likewise an "N0-symbol" is defined as a symbol of N0 bits, which can be seen as an element of the finite field $GF(2^{N0})$.

The first part M(0) is an N0-symbol calculated on the basis of C0.
The other q parts are calculated on the basis of a selected frame of a message C, and each part being an N-symbol.
The number of useful bits per page is therefore $N\_p=N0+q*N$.
The message C0 is decomposed into T0 parts of N0 bits denoted: $W(0), W(1), \ldots, W(T0-1)$.
The message C is decomposed into F frames, each frame into q words, each word into T N-symbols.
By denoting:
f the index of the frame in the message, $0<=f<=F-1$,
w the index of the words in a frame, $0<=w<=q-1$,
b the index of the N-symbol in a word, $0<=b<=T-1$
Then a current N-symbol in the message C is referenced by $C[f][w][b]$.

Figure 2:
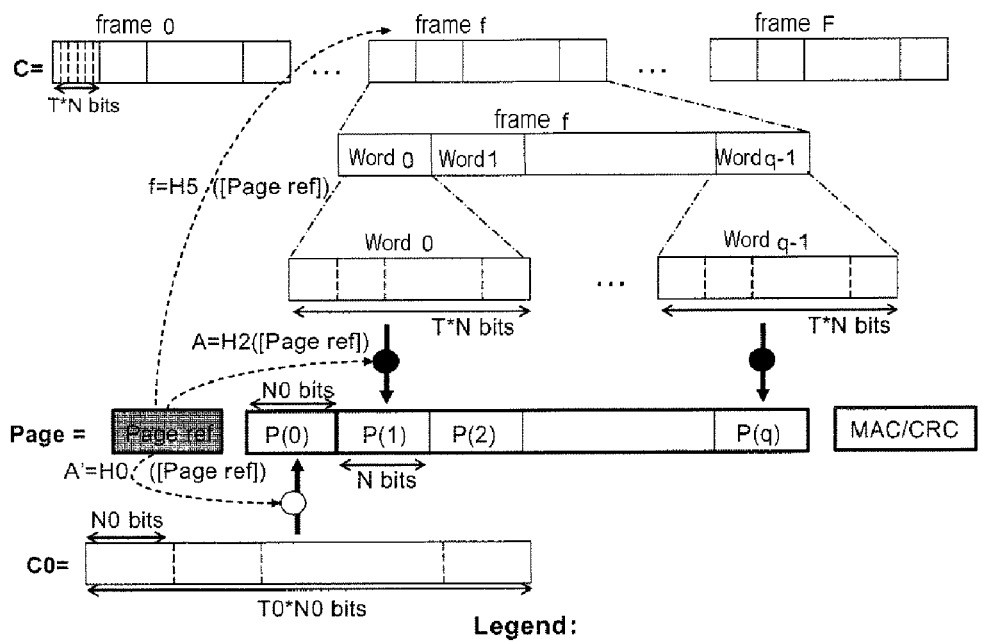

FIG. 2 summarizes the multiplexing defined subsequently in the description.

Extraction of the Information of C0 in the Current Page
Let C0 be the current signaling including T0 N0-symbols and denoted:

$$W(0), W(1), \ldots, W(T0-1)$$

Let $A'=H0([Page\ ref])$ be an N0-symbol calculated on the basis of [Page ref] with a function H0. The function H0 is, for example, such that H0([Page ref]) is nearly equidistributed within the set of N0-symbols when [page ref] changes in a random manner. The N0-symbol M(0) on the signaling embedded in the current page is:

$$M(0)=W(0)+W(1)*A'+W(2)*A'^2+\ldots+W(T0-1)*A'^{T0-1}$$

Where all the N0-symbols are considered to be elements $GF(2^{N0})$ and operations (+, *) are defined in this finite field.
Remark: Denoting by P(X) the polynomial defined by $P(X)=W(0)+W(1)X+W(2)*X^2+\ldots+W(T0-1)X^{T0}$ we have in fact defined M(0) as being the evaluation P(A') of the polynomial P at the point A'.

Reconstruction of the Signaling C0 at the Receiver Level:
At the receiver level, the current signaling C0 is recovered by using the information N0-symbols M(0) provided in each page.
As soon as T0 pages are available and the values H0([Page ref]) are distinct, C0 is recovered in the following manner:
A) Input for Recovering C0
 j, $0<=j<=T0-1$ an index for the T0 selected pages used for recovering the current signaling C0;
 $A'_0, A'_1, \ldots, A'_{T0-1}$ the distinct values of H0([Page ref]) associated with each selected page (j); $0<=j<=T0-1$;
 $Z(0), Z(1), \ldots, Z(T0-1)$ the T0 N0-symbols M(0) in a current selected page j, $0<=j<=T0-1$.
B) Output C0
The T0 N0-symbols of C0 denoted:
 $W(0), \ldots, W(T0-1)$
 are recovered on the basis of the previous data.
C) Calculation of the Output on the Basis of the Input
The vector of T0 N0-symbols $(W(0), W(1), \ldots W(T0-1))$ to be recovered is also considered to be a polynomial of $GF(2^{N0})$ [X] of degree T0-1:

$$P(X)=W(0)+W(1)X+\ldots+W(T0-1)X^{T0-1}$$

P(X) is recovered by means of an interpolation as being the only polynomial of degree T0-1 such that $P(A'j)=Z(j)$, for $0<=j<=T0-1$.
1) with the family of T0 points $(A'_0, \ldots, A'_{T0-1})$, the family of points T0 associated with the Lagrange polynomial is calculated. For $0<=j<=T0-1$, $Lj(X)$ is the unique polynomial of degree T0-1 such that $Lj(A'_k)=1$ for k=j and $Lj(A'_k)=0$ for $k<>j$.
$L_j(X)=B(j)*$(the product of T0-1 monomials $(X-A'_k)$, such that $0<=k<=T0-1$ and $k<>j$.)

B(j) is the element of $GF(2^{N0})$ which is the inverse in $GF(2^{N0})$ of the product of T0-1 elements $(A'_j-A'_k)$, $0<=k<=T0-1$ and $k<>j$.
2) the vector of T0 N0-symbols $(W(0), \ldots, W(T0-1))$, considered to be the polynomial P(X), is thereafter calculated in the following manner:

$$P(X)=Z(0)*L_0(X)+Z(1)*L_1(X)+\ldots+Z(T0-1)*L_{T0-1}(X).$$

Extraction of the Information of C in the Current Page:
Let F be the number of frames in C, q the number of words in a frame and T the number of N-symbols in a word.
The parameters F and T are calculated on the basis of the field "length of the message" included in the signaling C0. The parameter q is fixed (independent of the message) and known to the receiver.
The q N-symbols $M(1) \ldots M(q)$ of the current page are respectively information about the q words embedded in a specific frame of C. The index of the selected frame and the nature of the N-symbol of the information about its words are defined without ambiguity with the parameter [page ref].
Any N-symbol (N bits) is also considered to be an element of the finite field having $2^N$ elements $GF(2^N)$.
An information N-symbol for a word containing T N-symbols will be a linear combination of its T N-symbols considered in $GF(2^N)$.
More precisely:
The index of the frame selected from M is: $f=H5[page\ ref]$.
The function H5 is, for example, such that $f=H5([page\ ref])$ is nearly equidistributed in $[0, \ldots F-1]$ when [page ref] changes in a random manner.
Let us put $A=H2([Page\ ref])$ an N-symbol calculated on the basis of [Page Ref] with a function H2. The function H2 is, for example, such that H2([Page ref]) is nearly equidistributed in the set of N-symbols when [page ref] changes in a random manner.
Let:
 $W(0,0), W(0,1), \ldots, W(0,T-1)$ be the T N-symbols of the word FRAME[f][0] in the frame concerned f;
 $W(1,0), W(1,1), \ldots, W(1,T-1)$, the T N-symbols of the word FRAME[f][1] in the frame concerned f;
 . . .
 $W(q-1,0), \ldots, W(q-1,T-1)$, the T N-symbols of the word FRAME[f][q-1] in the frame concerned f.
 For $1<=j<=q$, the N-symbols M(j) are:

$$M(j)=W(j-1,0)+W(j-1,1)*A+W(j-1,2)*A^2+\ldots+W(j-1,T-1)*A^{T-1}$$

Where all the N-symbols are considered to be elements of $GF(2^N)$ and operations (+, *) are performed in this finite field.
As it is described hereinafter, as soon as a receiver recovers T pages relating to the frame and whose contents are $(M(0), \ldots, M(q-1))$ are distinct, it will be capable of readily recovering the entire frame regardless of the way in which the pages have been received by the receiver:
 By listening to a single signal,
 By listening to several signals in parallel,
 With several holes in the signal listened to or not.
Reconstruction of a Frame at the Receiver Level:
 At the receiver level, a current frame of q*T N-symbols, denoted FRAME[f], $0<=f<=F-1$, is recovered by using the pages such that H5 ([Page ref])=f.
As soon as T pages are available and the values of H2 ([Page ref]) are different, the frame is recovered using an interpolation function as is described below:
A) Inputs for Recovering the Current Frame:
 j, $0<=j<=T-1$ an index for the T selected pages that are used to recover the current frame;
 $A_0, A_1, \ldots, A_{T-1}$, be the different values of H2 ([Page ref]) associated with each selected page (j); $0<=j<=T-1$;
 $Z(j,0), Z(j,1), \ldots, Z(j,q-1)$ be the q N-symbols $M(1), \ldots M(q)$ of the selected current page j, $0<=j<=T-1$.

B) Output: the Current Frame

From the previous data, we recover the following q*T N-symbols in the current frame FRAME[f]:

(W(0,0), ..., W(0,T-1)), the T N-symbols of the word FRAME[f][0] in the frame concerned f, (W(k,0), ..., W(k,T-1)), the T N-symbols of the word FRAME[f][k] in the frame concerned f,

...

(W(q-1,0), ..., W(q-1,T-1)) the T N-symbols of the word FRAME[f][q-1] in the frame concerned f.

C) Calculation of the Output on the Basis of the Input

Each word of T N-symbols (W(k,0), W(k,1), ... W(k,T-1)) to be recovered is also considered to be a polynomial of $GF(2^N)$ [X] of degree T-1:

$$P_k(X) = W(k,0) + W(k,1)X + \ldots + W(k,T-1)X^{T-1}$$

$P_k(X)$ is recovered by interpolation as being the unique polynomial of degree T-1 such that $P_k(Aj) = Z(j,i)$, for $0 <= j <= T-1$.

1) with the family of T points $(A_0, \ldots, A_{T-1})$, the family of the T associated Lagrange polynomials is determined. For $0 <= j <= T-1$, $Lj(X)$ is the unique polynomial of degree T-1 such that $Lj(Ak) = 1$ for $k = j$ and $Lj(Ak) = 0$ for $k <> j$.

$Lj(X) = B(j)*$(the product of T-1 monomials (X-Ak), such that $0 <= k <= T-1$ and $k <> j$.)

B(j) is the element of $GF(2^N)$ which is the inverse in $GF(2^N)$ of the product of T-1 elements (Aj-Ak), $0 <= k <= T-1$ and $k <> j$.

2) The current word of T N-symbols (W(k,0), ..., W(k,T-1)), considered to be the polynomial $P_k(X) 0 <= k <= q-1$, is thereafter calculated in the following manner:

$$P_k(X) = Z(0,k)*L_0(X) + Z(1,k)*L_1(X) + \ldots + Z(T-1,k)*L_{T-1}(X).$$

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of managing erratic interruptions in a transmission system where messages to be transmitted are composed of data packets and are represented by a polynomial of degree t-1, one or more senders and one or more receivers sharing information enabling referencing of the data packets, comprising the method of:

in the course of the transmission of a message represented by a polynomial P, generating at least t' points Ai and the evaluations P(Ai) of the polynomial P, with t' greater than or equal to t, transmitting the evaluations P(Ai) of the t' points to the receiver or receivers, with information allowing the receivers to detect transmission errors, each receiver:

verifying reception of t valid evaluations, the valid evaluations being free of transmission errors, determining the points Ai based on the information referencing the data packets and the t valid evaluations P(Ai) of the polynomial, and on the basis of the P(Ai) and of the Ai, determining the polynomial P used based on the P(Ai) and Ai and deducing the message on the basis of said polynomial P;

wherein a signaling C0 associated with a message C is transmitted, the signaling being composed of T0*N0 bits and seen as a polynomial of degree (T0-1) and on reception:

T0 pages not containing any errors are collected, and each page using a different point from the other pages, on the basis of these pages the signaling C0 is reconstructed using a polynomial interpolation, wherein N0 is a number of bits;

the length of the message C and the way in which the message C has been sliced into F frames are deduced on the basis of C0, each frame sliced into q words, each of the words being represented by a polynomial of degree (T-1), T error-free evaluations of the polynomial are collected for each polynomial corresponding to a word, and by using distinct points, the message C is reconstructed using the polynomial interpolation.

2. The method as claimed in claim 1, wherein an interpolation function is used to determine the polynomial.

3. The method as claimed in claim 1, wherein the message is divided into several parts and the steps of claim 1 are applied to each part.

4. The method as claimed in claim 1, wherein the evaluations P(Ai) contained in an erroneous page are deleted and the receiver continues listening for new pages.

5. The method as claimed in claim 1, wherein the transmission system comprises a communication satellite.

6. A system for managing erratic interruptions in a transmission system comprising one or more senders Ej and one or more receivers Rk, wherein messages to be transmitted are composed of data packets and are expressed by means of a polynomial of degree t-1, the senders and the receivers sharing information to reference data packets, wherein the system for managing erratic interruptions comprises at least the following elements:

a formatting center; and the receivers executing the method of:

in the course of the transmission of a message represented by a polynomial P, generating at least t' points Ai and the evaluations P(Ai) of the polynomial P, with t' greater than or equal to t, transmitting the evaluations P(Ai) of the t' points to the receiver or receivers, with information allowing the receivers to detect transmission errors, each receiver:

verifying reception of t valid evaluations, the valid evaluations being free of transmission errors, determining the points Ai based on the information referencing the data packets and the t valid evaluations P(Ai) of the polynomial, and on the basis of the P(Ai) and of the Ai, determining the polynomial P used based on the P(Ai) and Ai and deducing the message on the basis of said polynomial P;

wherein a signaling C0 associated with a message C is transmitted, the signaling being composed of T0*N0 bits and seen as a polynomial of degree (T0-1) and on reception:

T0 pages not containing any errors are collected, and each page using a different point from the other pages, on the basis of these pages the signaling C0 is reconstructed using a polynomial interpolation, wherein N0 is a number of bits;

the length of the message C and the way in which the message C has been sliced into F frames are deduced on the basis of C0, each frame sliced into q words, each of the words being represented by a polynomial of degree (T-1), T error-free evaluations of the polynomial are collected for each polynomial corresponding to a word, and by using distinct points, the message C is reconstructed using the polynomial interpolation.

* * * * *